United States Patent
Griffin et al.

(10) Patent No.: US 12,307,549 B2
(45) Date of Patent: May 20, 2025

(54) SURROUNDING ASSESSMENT FOR HEAT MAP VISUALIZATION

(71) Applicant: INTERNATIONAL BUSINESS MACHINES CORPORATION, Armonk, NY (US)

(72) Inventors: Adam Lee Griffin, Cohasset, MN (US); Shikhar Kwatra, San Jose, CA (US); Spencer Thomas Reynolds, Austin, TX (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 1038 days.

(21) Appl. No.: 17/249,620

(22) Filed: Mar. 8, 2021

(65) Prior Publication Data

US 2022/0284634 A1 Sep. 8, 2022

(51) Int. Cl.
*G06T 11/00* (2006.01)
*G06N 5/04* (2023.01)

(52) U.S. Cl.
CPC ............... *G06T 11/00* (2013.01); *G06N 5/04* (2013.01)

(58) Field of Classification Search
CPC . G06T 11/00; G06T 2200/24; G06T 2200/00; G06T 11/206; G06T 11/20; G06T 19/006; G06T 19/00; G06N 5/04; G06N 5/00; G06N 20/00; G06F 3/011; G06F 3/01
(Continued)

(56) References Cited

U.S. PATENT DOCUMENTS

| 6,500,008 B1 | 12/2002 | Ebersole |
| 9,424,521 B2 | 8/2016 | Bloomquist |

(Continued)

FOREIGN PATENT DOCUMENTS

| DE | 102016105367 A1 | 9/2016 |
| IN | 201811037558 A * | 4/2020 |

(Continued)

OTHER PUBLICATIONS

Anonymous, "Method for preventing non-VR users from getting hit by VR users." IP.com No. IPCOM000255676D, IP.com Electronic Publication Date: Oct. 9, 2018, pp. 1-3.
(Continued)

*Primary Examiner* — Hwei-Min Lu
(74) *Attorney, Agent, or Firm* — Tihon Poltavets

(57) ABSTRACT

A method for assessing a surrounding area for heat map generation includes determining a location of a user and receiving historical information for the location of the user. The method also includes identifying a plurality of items in a surrounding area of the user, where the surrounding area includes at least a line of sight of the user as captured by an augmented reality device associated with the user. Analyzing the surrounding area of the user based on the plurality of items and the historical information to produce a plurality of risk levels for the plurality of items, where each risk level from the plurality of risk levels is associated with each item. Responsive to receiving sensory data for the user, the method also includes generating a heat map for the surrounding area of the user and display the heat map to the user in the augmented reality device.

20 Claims, 6 Drawing Sheets

(58) Field of Classification Search
USPC .......................................................... 706/11
See application file for complete search history.

(56) References Cited

U.S. PATENT DOCUMENTS

| | | | | |
|---|---|---|---|---|
| 2011/0161885 | A1* | 6/2011 | Gonia | G08B 21/12 |
| | | | | 715/764 |
| 2013/0080053 | A1 | 3/2013 | Rakshit | |
| 2016/0061625 | A1* | 3/2016 | Wang | G01C 21/3697 |
| | | | | 701/454 |
| 2017/0193379 | A1* | 7/2017 | Garnavi | G06Q 10/0635 |
| 2017/0193623 | A1* | 7/2017 | Garnavi | G06Q 10/0635 |
| 2017/0220863 | A1 | 8/2017 | Lection | |
| 2017/0292848 | A1* | 10/2017 | Nepomuceno | G01C 21/3492 |
| 2018/0121571 | A1* | 5/2018 | Tiwari | G08B 25/14 |
| 2018/0129276 | A1* | 5/2018 | Nguyen | G06F 3/0304 |
| 2018/0276485 | A1* | 9/2018 | Heck | G06N 7/01 |
| 2018/0322783 | A1* | 11/2018 | Toyoda | G06N 20/00 |
| 2019/0019032 | A1 | 1/2019 | Bostick | |
| 2019/0094952 | A1 | 3/2019 | Bostick | |
| 2019/0147655 | A1* | 5/2019 | Galera | G06T 15/20 |
| | | | | 345/419 |
| 2019/0164246 | A1* | 5/2019 | Ferranti | G06F 16/29 |
| 2019/0340909 | A1* | 11/2019 | Nguyen | B25J 9/1676 |
| 2020/0007741 | A1* | 1/2020 | Johnson | H04N 23/66 |
| 2020/0074383 | A1* | 3/2020 | Smith | F16P 3/14 |
| 2020/0166366 | A1* | 5/2020 | Herman | G06V 20/56 |
| 2020/0175767 | A1* | 6/2020 | Stivi | G08B 25/10 |
| 2020/0202471 | A1* | 6/2020 | Barak | G06Q 10/063114 |
| 2020/0219372 | A1 | 7/2020 | Kwatra | |
| 2020/0302510 | A1* | 9/2020 | Chachek | G06V 20/52 |
| 2020/0326199 | A1* | 10/2020 | Hendrix | H04R 5/04 |

FOREIGN PATENT DOCUMENTS

| | | | | |
|---|---|---|---|---|
| WO | | 2018048913 A1 | 3/2018 | |
| WO | WO-2018200315 A1 * | 11/2018 | ........... | G02B 27/017 |

OTHER PUBLICATIONS

Bujari et al., "A mobile sensing and visualization platform for environmental data." Pervasive and Mobile Computing, vol. 66, 101204, 2020, pp. 1-11.

IBM, "AR and VR in the Workplace", https://www.ibm.com/thought-leadership/institute-business-value/report/ar-vr-workplace?mhsrc=ibmsearch_a&mhq=vr%20ar, printed Dec. 23, 2020, pp. 1-9.

IBM, "Computer Vision and Augmented Reality", Technology and Solutions for Object Recognition and Augment on cloud and mobile platforms, https://www.research.ibm.com/haifa/dept/imt/ist_dm.shtml, accessed Dec. 23, 2020, pp. 1-3.

IBM, "Smarter Business Review—Services Blog", Secrets of success from a challenging year, https://www.ibm.com/blogs/services/, printed Dec. 23, 2020, pp. 1-6.

Mell et al., "The NIST Definition of Cloud Computing", National Institute of Standards and Technology, Special Publication 800-145, Sep. 2011, pp. 1-7.

Ramirez, "Today's Most Dangerous Occupations", https://textninja.com/2018/03/14/most-dangerous-occupations/, printed Dec. 23, 2020, pp. 1-7.

Statista, "• VR/AR market size 2020", https://www.statista.com/statistics/591181/global-augmented-virtual-reali . . . , printed Dec. 23, 2020, pp. 1-3.

* cited by examiner

SURROUNDING ASSESSMENT FOR HEAT MAP VISUALIZATION

BACKGROUND

This disclosure relates generally to augmented reality, and in particular to assessing an area surrounding a user for generating a heat map visualization.

Presently, manufacturing and warehouse floors utilize various forms of automation and robotics in conjunction with human operators to manufacture and handle products. Though automation and robotics utilize various sensors programmed to provide safe operations in a given environment, the human operators have to remain vigilant in the given environment to provide another layer of protection. The products handled through automation and robotics can vary day-to-day and hour-by-hour, thus resulting in a constantly changing environment for the human operator.

SUMMARY

Embodiments in accordance with the present invention disclose a method, computer program product and computer system for assessing a surrounding area for heat map generation, the method, computer program product and computer system can, responsive to determining a location of a user, receive historical information for the location of the user. The method, computer program product and computer system can identify a plurality of items in a surrounding area of the user, wherein the surrounding area includes at least a line of sight of the user as captured by an augmented reality device associated with the user. The method, computer program product and computer system can analyze the surrounding area of the user based on the plurality of items and the historical information for the location of the user to produce a plurality of risk levels for the plurality of items, wherein each risk level from the plurality of risk levels is associated with each item from the plurality of items. The method, computer program product and computer system can, responsive to receiving sensory data for the user, generate a heat map for the surrounding area of the user, wherein the heat map is based on the plurality of risk factors for the plurality of items in the surrounding area. The method, computer program product and computer system can display the heat map to the user in the augmented reality device.

DETAILED DESCRIPTION

Embodiments of the present invention assess a surrounding area at a location of a user and generate a heat map for risk levels associated with multiple objects in the surrounding area. Responsive to determining the location of the user, embodiments of the present invention receive historical information for the location of the user and identify items in the surrounding area of the user. Embodiments of the present invention analyze the surrounding area of the user and receive sensory data for the user to generate a personalized heat map for the surrounding area of the user. Embodiments of the present invention display the heat map for the surrounding area in a device associated with the user and responsive to determining a safe movement path through the heat map, embodiments of the present invention display the safe movement path through the heat map for the surrounding area in the device associated with the user.

Figure 1:
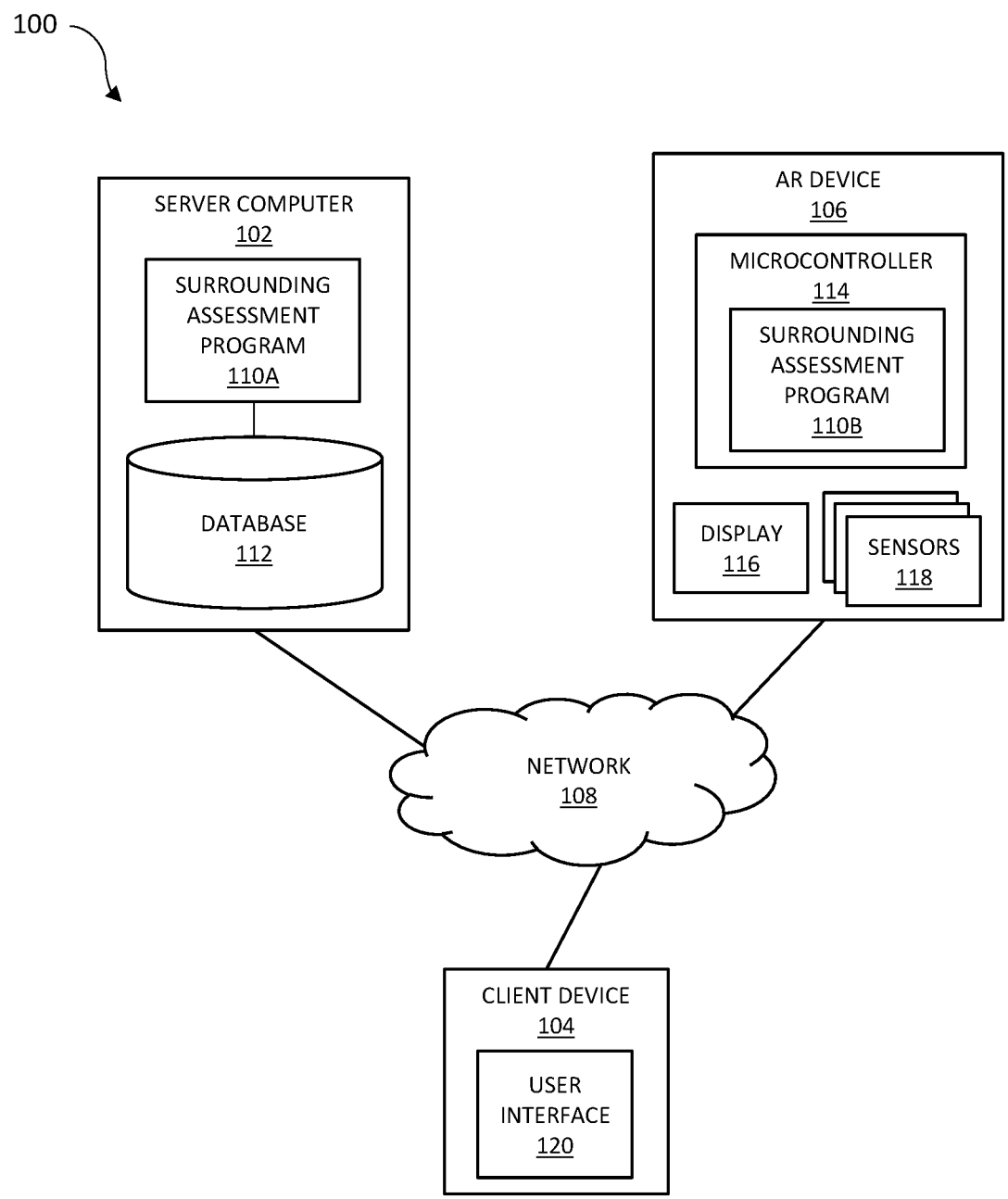
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment includes server computer 102, client device 104, and augmented reality (AR) device 106 all interconnected over network 108. Server computer 102 can be a standalone computing device, a management server, a web server, a mobile computing device, or any other electronic device or computing system capable of receiving, sending, and processing data. In other embodiments, server computer 102 can represent a server computing system utilizing multiple computers as a server system, such as in a cloud computing environment. In another embodiment, server computer 102 can be a laptop computer, a tablet computer, a netbook computer, a personal computer (PC), a desktop computer, a smart phone, or any programmable electronic device capable of communicating with client device 104, AR device 106, and other computing devices (not shown) within the distributed data processing environment via network 108. In another embodiment, server computer 102 represents a computing system utilizing clustered computers and components (e.g., database server computers, application server computers, etc.) that act as a single pool of seamless resources when accessed within the distributed data processing environment. Server computer 102 includes server-side surrounding assessment program 110A and database 112. Server computer 102 may include internal and external hardware components, as depicted and described in further detail with respect to FIG. 4.

Client device 104 can be a laptop computer, a tablet computer, a smart phone, smart watch, a smart speaker, or any programmable electronic device capable of communicating with various components and devices within the distributed data processing environment (e.g., server computer 102 and AR device 106), via network 108. Client device 104 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In general, client device 104 represents one or more programmable electronic devices or combination of programmable electronic devices capable of executing machine readable program instructions and communicating with other computing devices (not shown) within the distributed data processing environment via a network, such as network 108. In one embodiment, client device 104 represents one or more devices associated with a user. Client device 104 includes an instance of user interface 120 for interacting with surrounding assessment program 110A on server computer 102 and surrounding assessment program 110B on AR device 106.

AR device 106 represents a user wearable augment reality device (e.g., electronic contact lens, wearable electronic headset) with integrated microcircuitry capable of displaying content to the user. AR device 106 includes microcontroller 114, display 116, sensor 118, where surrounding assessment program 110B operating on microcontroller 114 manages and displays content in display 116. Microcontroller 114 can include a display control circuit for display 116, a communication and power conversion circuit for communicating via network 108 and managing an integrated power supply, and a sensor readout and control circuit for monitoring eye movement of the user wearing AR device 106. Display 116 allows for a user to view a heat map for a surrounding area, navigational instructions, menu items, and any other type of content that surrounding assessment program 110A and 110B can provide to the user of AR device 106. In an example where AR device 106 is an electronic contact lens, display 116 is a semitransparent display and microlens array is integrated into AR device 106 for viewing content. AR device 106 can also include a power storage module, a solar cell module for charging the power storage module, a biosensor module for collecting data (e.g., tracking eye movement), and a communications and power module for communicating with server computer 102 and client device 104 via network 108. Sensors 118 (e.g., biosensor module) collect various data for the user of AR device 106, where surrounding assessment program 110 utilizes the data collected by sensors 118 to generate a heat map for a surrounding area. Sensors 118 can include one or more of: an accelerometer, a barometer, a gyroscope sensor, a heart rate sensor, and an orientation sensor.

Network 108 can be, for example, a telecommunications network, a local area network (LAN), a wide area network (WAN), such as the Internet, or a combination of the three, and can include wired, wireless, or fiber optic connections. Network 108 can include one or more wired and/or wireless networks capable of receiving and transmitting data, voice, and/or video signals, including multimedia signals that include voice, data, and video information. In general, network 108 can be any combination of connections and protocols that will support communications between server computer 102, client device 104, AR device 106, and other computing devices (not shown) within the distributed data processing environment.

Surrounding assessment program 110 generates a heat map based on various risk factors for an area surrounding a user of AR device 106. Surrounding assessment program 110 determines a location (e.g., factory or warehouse floor) for a user associated with AR device 106, where in some embodiments AR device 106 is paired to client device 104. Surrounding assessment program 110 receives historical information for the location of the user and identifies items in a surrounding area of the user. Surrounding assessment program 110 analyzes the surrounding area of the user and receives sensory data for the user from sensors 118 on AR device 106. Based on an analysis of the surrounding area and the sensory data for the user, surrounding assessment program 110 generates the heat map for the surrounding are of the user and displays the heat map for the surrounding area in client device 104 and/or AR device 106. Surrounding assessment program 110 determines a path through the heat map for the surrounding area of the user and displays the path through the heat map for the surrounding area in client device 104 and/or AR device 106.

Database 112 is a repository that stores various data including risk factors for known objects (e.g., manufacturing robotics), floorplans (e.g., manufacturing floor, warehouse floor), operational specifications for each known object (e.g., swooping radius of a robotic arm), historical operational data for each object, historical operation data for a user of AR device 106, and any other data pertinent to surrounding assessment program 110 for generating a heat map for a surrounding area relative to the user of AR device 106 and determining navigational instructions through the heat map. In the depicted embodiment, database 112 resides on server computer 102. In another embodiment, database 112 may reside on client device 104 or elsewhere within the distributed data processing environment provided surrounding assessment program 110 has access to database 112. A database is an organized collection of data, where database 112 can be implemented with any type of storage device capable of storing data and configuration files that can be accessed and utilized by surrounding assessment program 110, such as a database server, a hard disk drive, or a flash memory.

User interface 120 enables a user to make requests of or issue commands to server computer 102, client device 104, and AR device 106 via network 108. User interface 120 also enables the user to receive information and instructions in response on client device 104 via network 108. In one embodiment, a user of client device 104 accesses user interface 120 via voice commands in natural language. In one embodiment, user interface 120 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 120 enables a user of client device 104 to interact with each instance of surrounding assessment program 110A and 110B operating on server computer 102 and AR device 106, respectively.

Figure 2:
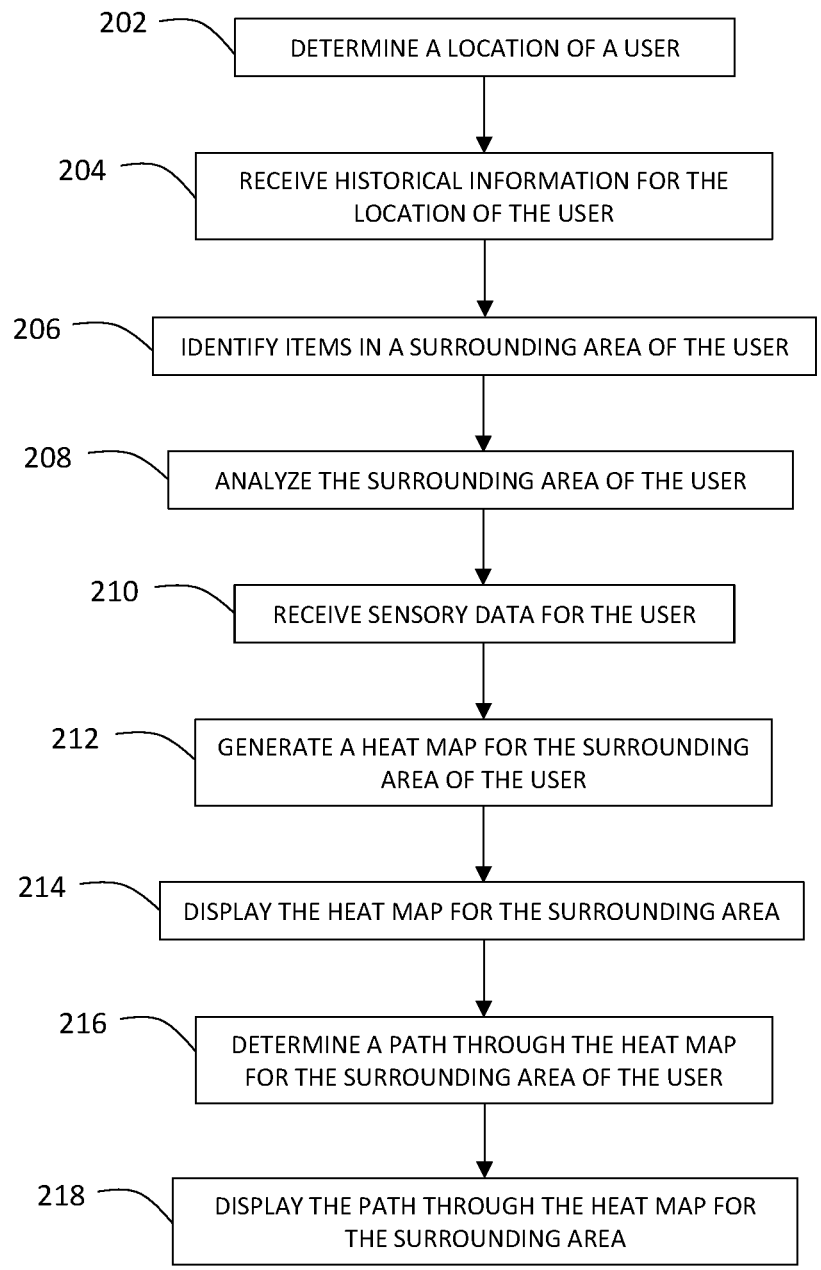
FIG. 2 is a flowchart depicting operational steps of a surrounding assessment program for assessing a surrounding area for generating a heat map visualization, in accordance with an embodiment of the present invention.

FIG. 2 is a flowchart depicting operational steps of a surrounding assessment program for assessing a surrounding area for generating a heat map visualization, in accordance with an embodiment of the present invention.

Surrounding assessment program 110 determines (202) a location of a user. Surrounding assessment program 110 determines the location of the user based on location information received from a device associated with the user (e.g., AR device, client device). Surrounding assessment program 110 allows for the user to establish privacy settings which define when surrounding assessment program 110 receives location information for the user. In some embodiments, surrounding assessment program 110 continuously receives location information from the device associated with the user. In other embodiments, surrounding assessment program 110 receives location information for the user at specific points in time and/or set intervals in time (e.g., work hours 9 am-5 pm, Monday through Friday), as defined by the user. Surrounding assessment program 110 can also receive location information for the user subsequent to determining that the user entered a given area (e.g., warehouse or factory floor), based on the device associated with the user connecting to a local network within the given area. The given area can include multiple subareas, where each subarea from the multiple subareas can include various risk factors for generating a heat map for the surrounding area of the user.

In one embodiment, surrounding assessment program 110 determines a user with an associated device is entering a defined work area (e.g., manufacturing floor) based on an AR device associated with the user pairing to a local network in the defined work area. Surrounding assessment program 110 receives location information from the AR device and determines a location of the user within the defined work area based on the received location information. As long as the AR device is connected to the local network and/or the location information from the AR device is for a position within the given work area, surrounding assessment program 110 can continuously receive the location information from the AR device associated with the user. In another embodiment, surrounding assessment program 110 utilizes a user defined time interval of 5am-6 pm for determining a location of the user, where the user defined time interval represents work hours for the user. Surrounding assessment program 110 receives the location information from a device associated with the user during the defined time interval and determines a location of the user.

Surrounding assessment program 110 receives (204) historical information for the location of the user. Historical information for the location can include various information associated with the determined location and/or the user, for determining various risk factor for items within the determined location. Historical information for the user can include operational qualifications for operating one or more machinery items at the determined location. Historical information for the determined location can include a location for specific machinery in the determined location, a list of manufacturers specified risks for specific machinery, specified walking areas, specified risk areas, historically identified walking areas, locations for incident reports, and crowdsourced user defined risk areas. The location for specific machinery in the determined location can include a location of an area for a footprint of the specific machinery, dimensions for the specific machinery, an operational area for the specific machinery, and an operational volume for the specific machinery. The operational area and the operational volume represent a space required for the specific machinery to operate (e.g., a sweeping area of a robotic arm) without interference from other objects and operating users. In some embodiments, the operational area and the operational volume can differ for the specific machinery based on a component being handled by the specific machinery. Surrounding assessment program 110 has the ability to source dimensions for a specific machinery, an operational area for the specific machinery, and an operational volume for the specific machinery directly from a manufacturer.

The list of manufacturers specified risks for specific machinery can include portions of the specific machinery to avoid contacting to avoid injury, portions of the specific machinery to avoid contacting to avoid contamination, and a list of safe equipment for operating the specific machinery. Specified walking areas represent defined areas for the user to travel at the determined location without interfering with specific machinery at the determined location. Specified risk areas represent defined areas for the user to avoid at the determined location to avoid interfering with specific machinery at the determined location. Historically identified walking areas represent an overlay on the specified walking area for locations where surrounding assessment program 110 previously received location information from devices associated with multiple users traveling at the determined location. Locations for incident reports represent one or more event occurrences (e.g., unexpected movement from a specific machinery) at the determined location for the user. Crowdsourced user defined risk areas represent user defined define areas to approach with caution at the determined location to avoid potentially interfering with specific machinery at the determined location. Surrounding assessment program 110 can receive the crowdsourced user defined risk area when displaying a heat map to the user for a surrounding area at the determined location, discussed in detail with regard to (214).

Surrounding assessment program 110 identifies (206) items in a surrounding area of the user. Surrounding assessment program 110 identifies items in a surrounding area of the user based on the determined location of the user and items captured by a device (e.g., AR device) associated with the user. In one embodiment, surrounding assessment program 110 utilizes a surrounding area representing an area in a line of sight as captured by a forward-facing camera on an AR device, where the line of sight of the camera represents the line of sight of the user associated with the AR device. In another embodiment, surrounding assessment program 110 utilizes a surrounding area representing an area in a line of sight as captured by a forward-facing camera on an AR device and a surrounding vicinity of the user (e.g., radius of 3 meters). The surrounding vicinity of the user of the user includes areas not captured by the forward-facing camera on the AR device (e.g., behind the user) and allows for surrounding assessment program 110 to identify items not in the line of sight of the user.

Based on the determined location of the user, surrounding assessment program 110 identifies stationary known items in a surrounding area of the user and identifies mobile known items in the surrounding area of the user. Surrounding assessment program 110 has the ability to utilize known floorplans of the determined location (e.g., warehouse floor, manufacturing floor) to identify where stationary items are positioned in the floorplan relative to the determined location of the user. Furthermore, surrounding assessment program 110 has the ability to utilize known travel paths of mobile items within the floorplan of the determined location to identify where the mobile items travel relative to the determined location of the user. Surrounding assessment program 110 also identifies items in a surrounding area by receiving an image from a forward-facing camera on an AR device associated with the user, where the image represents the line of sight of the user. Surrounding assessment program 110 identifies the items in the image utilizing object recognition software and can compare the identified items in the image to any identified stationary and/or mobile items relative to the determined location of the user. In other embodiments, surrounding assessment program 110 can communicate with various Internet of Things (IoT) devices within the surrounding area to identify items in the surrounding area of the user, where surrounding assessment program 110 can receive location information for the IoT devices and/or images captured of the surrounding area of the user.

Surrounding assessment program 110 analyzes (208) the surrounding area of the user. In this embodiment, surrounding assessment program 110 analyzes the surrounding area of the user based on risk factors for the identified items in the surrounding area of the user. For each of the identified items, surrounding assessment program 110 determines a risk factor relative to the user with the associated AR device based on the determined location of the user and the received historical information for the location of the user. For each of the identified items, surrounding assessment program 110 determines a distance between a specific identified item and the determined location of the user. Surrounding assessment program 110 parses the received historical information for the location of the user to identify a portion of historical information relevant to the specific identified item. As previously discussed, historical information for the user can include operational qualifications for operating one or more machinery items at the determined location and historical information for the determined location can include a location for specific machinery in the determined location, a list of manufacturers specified risks for specific machinery, specified walking areas, specified risk areas, historically identified walking areas, locations for incident reports, and crowdsourced user defined risk areas. Subsequent, to identifying the portion of historical information relevant to the specific identified item, surrounding assessment program 110 determines a risk score for the specific identified item relative to the determined location of the user.

In one example, surrounding assessment program 110 determines that a previously identified item is machinery AB for assisting in moving loads on a factory floor is located 1.5 meters from the user based on a known stationary location for machinery AB and the determined location of the user. Surrounding assessment program 110 parses the received historical information for the location of the user and identifies a portion of the historical information relevant to the machinery AB. Based on the portion of the historical information relevance to machinery AB, surrounding assessment program 110 determines that machinery AB has an operational area positioned on a central axis in a shape of a circle with a radius of 2 meters. Furthermore, surrounding assessment program 110 determines that machinery AB has a specified risk area positioned on a central axis in a shape of a circle with a radius of 2 meters, where the specified risk area represents a defined area for the user to avoid at the determined location to avoid interfering with specific machinery (i.e., machinery AB) at the determined location. Based on the user being located within the operational area of machinery AB and a specified risk area, surrounding assessment program 110 determines that machinery AB poses a high risk to the user at the determined location of the user.

In another example, surrounding assessment program 110 determines that a previously identified mobile item is machinery AC for assisting in moving loads on a warehouse floor is located 6 meters from the user based on a known location for machinery AC at a specific time and the determined location of the user. Surrounding assessment program 110 parses the received historical information for the location of the user and identifies a portion of the historical information relevant to the machinery AC. Based on the portion of the historical information relevance to machinery AC, surrounding assessment program 110 determines that machinery AC is a mobile item that travels along a set path. Furthermore, surrounding assessment program 110 determines the set path crosses a specified walking area, where the user has historically utilized (i.e., historically identified walking areas). Based on the user being in a specified walking area that crosses the set path of machinery AC, surrounding assessment program 110 determines that machinery AC poses a moderate risk to the user at the determined location of the user. Furthermore, if surrounding assessment program 110 determines the user is walking at the determined location and is expected to cross paths with the set path of machinery AC (i.e., collision), surrounding assessment program 110 can elevate the moderate risk to a high risk since the user is expected to cross paths with machinery AC as it moves across the set path where the user will be located.

In yet another example, surrounding assessment program 110 determines that a previously identified item is machinery AD located on a factory floor 3 meters from the user based on a known stationary location for machinery AD and the determined location of the user. Surrounding assessment program 110 parses the received historical information for the location of the user and identifies a portion of the historical information relevant to the machinery AD. Based on the portion of the historical information relevance to machinery AD, surrounding assessment program 110 determines that machinery AD has an operational area positioned on a central axis in a shape of a circle with a radius of 2 meters. Furthermore, surrounding assessment program 110 determines that machinery AD has multiple crowdsourced user defined risk areas, where the multiple crowdsourced user defined risk areas define an area positioned on a central axis of machinery AD in a shape of a circle with a radius of 4 meters based on a noise level (e.g., decibel reading) emitted by machinery AD when operational. Based on the user being located within the multiple crowdsourced user defined risk areas, surrounding assessment program 110 determines that machinery AD poses a moderate risk to the user at the determined location of the user.

Surrounding assessment program 110 receives (210) sensory data for the user. In this embodiment, surrounding assessment program 110 receives sensory data for the user from one or more device associated with the user (e.g., AR device, client device, fitness tracker). The sensory data is collected by one or more sensors that include an accelerometer, a barometer, a gyroscope sensor, a heart rate sensor, and an orientation sensor. Surrounding assessment program 110 utilizes the sensory data from an accelerometer to determine if the user is stationary, walking, or running. Surrounding assessment program 110 utilizes the sensory data from a barometer to determine a pressure at the determine location for the user. Surrounding assessment program 110 utilizes sensory data from a gyroscope sensor to determine if the user is upright, leaning forward, leaning backwards, and/or bending down. Surrounding assessment program 110 utilizes sensory data from a heart rate sensor to determine if the user is experiencing elevated heart rate (e.g., due to loud machinery) or lowered heart rate (e.g., due to drowsiness). Surrounding assessment program 110 utilizes an orientation sensor to determine a direction the user is facing while stationary or moving. Surrounding assessment program 110 utilizes the received sensory data to weight the risk factors for the identified items in the surrounding area based on a specific user.

In one example, surrounding assessment program 110 previously identified machinery BA in a surrounding area of a user, as posing a low risk. Surrounding assessment program 110 receives sensory data for the user and determines an orientation of the user, where the orientation of the user positions machinery BA behind the user. Furthermore, surrounding assessment program 110 determines the user is moving backwards towards machinery BA behind the user, where the user does not have visual of machinery BA due to machinery BA a position of machinery BA not being in a line of sight of the user. Surrounding assessment program 110 applies a higher weight to the low risk assessment of machinery BA, since the user is approaching machinery BA and does not have a visual of machinery BA.

In another example, surrounding assessment program 110 previously identified machinery BB in a surrounding area of a user as posing a moderate risk, where machinery BB is a mobile item. Surrounding assessment program 110 receives sensory data for the user and determines an orientation of the user, where the orientation of the user positions machinery BB behind a pillar on a warehouse floor and is not in a line of sight of the user. Furthermore, surrounding assessment program 110 determines the user is moving forward along a path that intersects with a set path of machinery BB, where a potential of a collision between the user and machinery BB exists. surrounding assessment program 110 applies a higher weight to the moderate risk assessment, since the user is approaching machinery BB, does not have a visual of machinery BB, and a potential of a collision exists.

Surrounding assessment program 110 generates (212) a heat map for the surrounding area of the user. In this embodiment, surrounding assessment program 110 generates the heat map for the surrounding area of the user, where the surrounding area represents a surrounding vicinity of the user (e.g., radius of 3 meters). In another embodiment, surrounding assessment program 110 generates a first heat map for an area in a line of sight as captured by a forward-facing camera on an AR device and generates a second heat map for a surrounding vicinity of the user, where the first heat map can be three-dimensional, and the second heat map can be two dimensional. Surrounding assessment program 110 generates the heat map by applying the weighted risk levels to the identified items in the surrounding area of the user, where each weighted risk level is associated with each identified item in the surrounding area of the user. The heat map represents a data visualization technique that show a magnitude of risk level as color in two or three dimensions, where a variation in a hue and/or intensity of a color represents the risk level for each of the identified items in the surrounding area of the user.

Surrounding assessment program 110 displays (214) the heat map for the surrounding area. Surrounding assessment program 110 displays the heat map for the surrounding area in one or more devices associated with the user (e.g., mobile device, AR device). For displaying the heat map for the surrounding area in an AR device, surrounding assessment program 110 displays a three-dimensional overlay of the heat map on a portion of the identified items in the line of sight of the user, where each three-dimensional overlay on each identified item represents a weighted risk level to the user. As a user rotates, the AR device captures an orientation of the user and surrounding assessment program 110 displays the three-dimension overlay of the heat map on another portion of the identified items in the new line of sight of the user. Surrounding assessment program 110 can also display multiple overlays if a first identified item blocks a view of a second identified item, where the first identified item has a weighted risk level different from a weight risk level of the second identified item. Surrounding assessment program 110 can display an overlay for the first identified item on top of an overlay for the second identified item, representing that the first identified item blocks a view of the second identified item. Surrounding assessment program 110 can also display side markers (discussed in further detail with regard to FIG. 3A) in a peripheral area of a view in the AR device, where each side marker is associated with an identified item in the surrounding area that is not located in a line of sight of the user. Each side marker indicates a position of an identified item in the surrounding area and as the user changes an orientation of the AR device, the identified item comes into view in a line of sight of the user and surrounding assessment program 110 ceases to display the corresponding side marker.

For displaying the heat map for a surrounding area in a client device (e.g., mobile device), surrounding assessment program 110 displays a two-dimensional overlay on an overhead view of the surrounding area of the user at the determined location. Surrounding assessment program 110 allows for the user to view an overhead view for the line of sight of the AR device associated with the user or an overhead view for the vicinity surrounding the user at the determined location. The two-dimensional overlay on the overhead view allows for the user to locate any identified items that are blocked by other identified items in the line of sight view in the AR device. For stationary identified items, surrounding assessment program 110 overlays the heat map on the stationary identified items. For mobile identified items, surrounding assessment program 110 overlays the heat map on the mobile identified items, where the overlay follows an expected movement of the mobile identified item as it travels along a known set path.

Surrounding assessment program 110 determines (216) a path through the heat map for the surrounding area of the user. Surrounding assessment program 110 utilizes previously received historical information to determine the path through the heat map for the surrounding area of the user to avoid the identified items in the surrounding area. As previously discussed, the historical information includes a location for specific machinery in the determined location, a list of manufacturers specified risks for specific machinery, specified walking areas, specified risk areas, historically identified walking areas, locations for incident reports, and crowdsourced user defined risk areas. The location for specific machinery in the determined location can include a location of an area for a footprint of the specific machinery, dimensions for the specific machinery, an operational area for the specific machinery, and an operational volume for the specific machinery. Surrounding assessment program 110 utilizes the previously received historical information to establish paths through the heat map, if the user is not interacting with an identified item. A distance between a path and a weighted high-risk item can be greater than a distance between a path and a weighted low risk item in the surrounding area of the user, thus allowing a greater margin of safety for the user with the AR device.

Surrounding assessment program 110 displays (218) the path through the heat map for the surrounding area. Surrounding assessment program 110 displays the path through the heat map for the surrounding area in one or more device associated with the user (e.g., mobile device, AR device). For displaying the path through the heat map for the surrounding area in an AR device, surrounding assessment program 110 displays a three-dimensional outline overlay on a determined path for navigating between the identified items in the heat map for the surrounding area. Additionally, surrounding assessment program 110 displays three-dimensional directional arrows indicating possible paths to take along the outline overlay for the determined path for navigating between the identified items in the heat map for the surrounding area. For displaying the path through the heat map for the surrounding area in a client device (e.g., mobile device), displays a two-dimensional outline overlay on an overhead view of a determined path for navigating between the identified items in the heat map for the surrounding area. Additionally, surrounding assessment program 110 displays two-dimensional directional arrows indicating possible paths to take along the outline overlay for the determined path for navigating between the identified item in the heat map for the surrounding area.

Figure 3A:
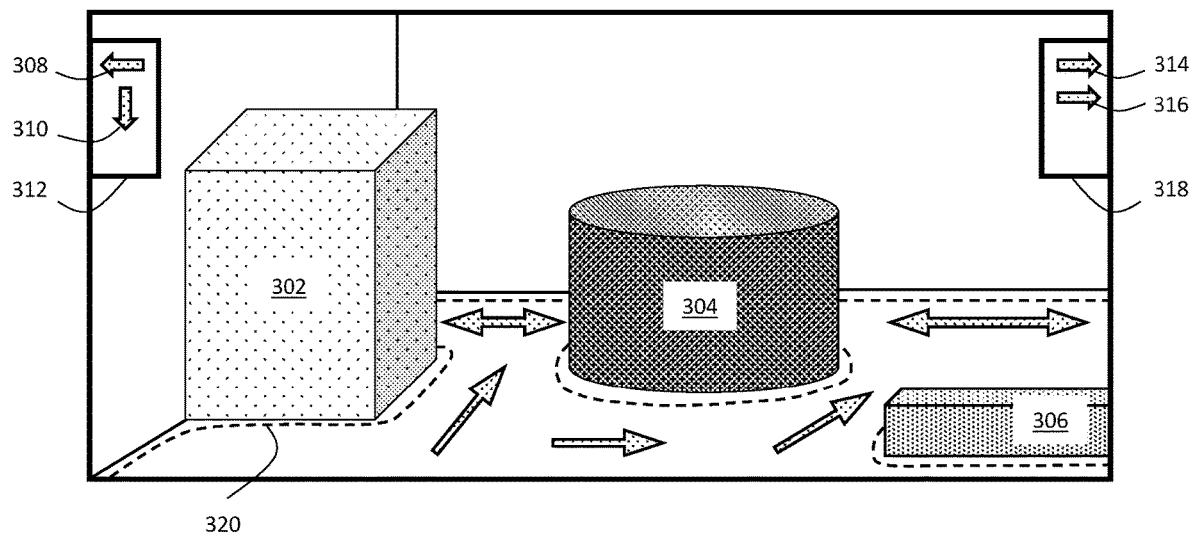
FIG. 3A illustrates a first-person perspective view of a heat map visualization that a surrounding assessment program generates for a surrounding area, in accordance with an embodiment of the present invention.
Figure 3B:
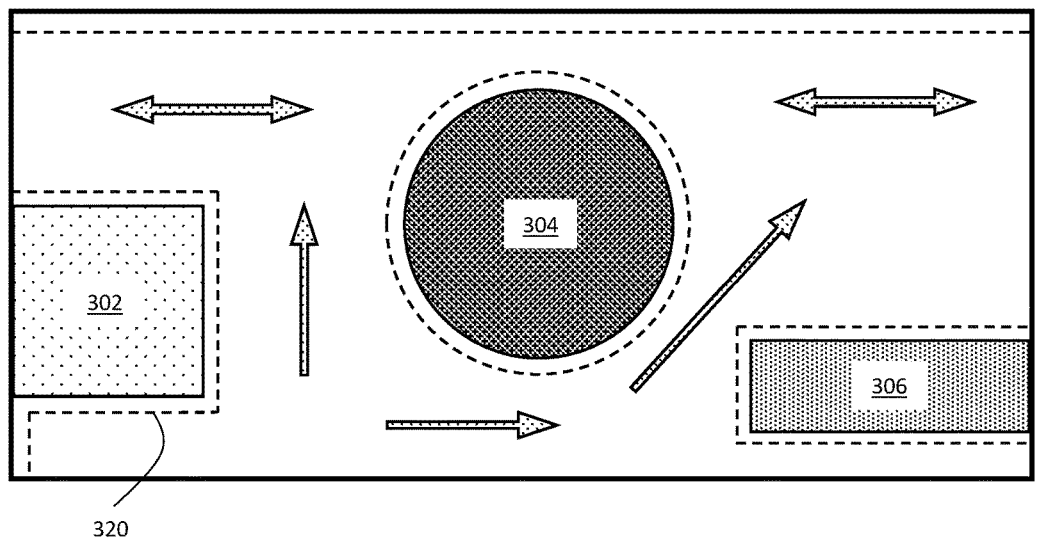
FIG. 3B illustrates an overhead view of a heat map visualization that a surrounding assessment program generates for a surrounding area, in accordance with an embodiment of the present invention.

FIG. 3A illustrates a first-person perspective view of a heat map visualization that a surrounding assessment program generates for a surrounding area, in accordance with an embodiment of the present invention. In this example, surrounding assessment program 110 displays a heat map for a surrounding area of a user in an AR device, where surrounding assessment program 110 displays a three-dimensional overlay of the heat map on a portion of identified item in a line of sight of the user wearing the AR device. Surrounding assessment program 110 previously identified items 302, 304, and 306 in the surrounding area of the user, where identified item 302 is low risk, identified item 304 is high risk and identified item 306 is moderate risk. Surrounding assessment program 110 also displays side markers 308 and 310 in left peripheral area 312 and side markers 314 and 316 in right peripheral area 318. Side marker 308 indicates there is an identified object to the left of the user, outside of the line of sight view in the AR device. Side marker 310 indicates there is an identified object behind the user, outside of the line of sight view in the AR device. Side markers 314 and 316 indicates there are two identified objects to the right of the user, outside of the line of sight view in the AR device. If the user rotates in the left direction, the identified object to the left of the user comes into view in the line of sight view of the AR device and surrounding assessment program 110 no longer needs to display side marker 308 in left peripheral area 312. Surrounding assessment program 110 also displays a three-dimensional outline overlay 320 on a determined path for navigating between identified items 302, 304, and 306 and three-dimensional directional arrows indicating possible paths to take along the three-dimensional outline overlay 320 for the determined path FIG. 3B illustrates an overhead view of a heat map visualization that a surrounding assessment program generates for a surrounding area, in accordance with an embodiment of the present invention. In this example, surrounding assessment program 110 displays a heat map for a surrounding area of a user in a mobile device, where surrounding assessment program 110 displays a two-dimensional overlay of the heat map on an overhead view on a portion of identified item in a line of sight of the user wearing the AR device. As previously mentioned in FIG. 3A, surrounding assessment program 110 previously identified items 302, 304, and 306 in the surrounding area of the user, where identified item 302 is low risk, identified item 304 is high risk and identified item 306 is moderate risk. Surrounding assessment program 110 also displays a two-dimensional outline overlay 320 on a determined path for navigating between identified items 302, 304, and 306 and three-dimensional directional arrows indicating possible paths to take along the three-dimensional outline overlay 320 for the determined path. Surrounding assessment program 110 pro-vides an overhead view of the surrounding area in the line of sight of the user to allow for the user to view areas blocked by identified items 302, 304, and 306.

Embodiments of the present invention provide a system for analyzing surrounding visual inputs, contextual inputs, and IoT device feed from a surrounding environment to identify types of risk, severity of risks, and a distance from target objects which include the risks. The system generates a heat map of risk factors within the surroundings of the user and displays a safe movement path for the user. While showing the heat map of risk factors, the system considers a state of a user, qualifications of a user for operating a target object, and geolocation information and customizes the heat map of risk factors accordingly for the user. The system can also utilize a knowledge corpus to show if any risk factor is time or location dependent, where a target object can have different levels of risk factors at different times of a day, week, month, and season. The system can share risk insights based on an opt-in agreement and aggregated crowdsourcing experiences, where users can provide feedback regarding experiences of risk in the surrounding environment. The system can predict a mobility path and speed of mobility of target objects to adjust the safe movement path for the user and display the safe movement path to the user in the surrounding environment.

Embodiments of the present invention utilizes historical learning by identifying risk factors associated with different objects and categorizing the different objects. Levels of risk can be calculated based on distance, historical evidence, or event occurrences with regards to the different objects. Types of risk are identified utilizing K-means/density-based spatial clustering of application with noise (DBSCAN) clustering infused with a long-short term memory network (LSTM) and convolutional neural network (CNN) model for tracking historical evidence and event occurrences, for alerting a user via a heat map display. Utilizing historical data, personalized profile preferences, and qualification required to address the risk are identified and factored into the weights of the algorithm. IoT data, sensor imaging, visuals, and audio are gathered from a surrounding area to identity rick factors and a set of spatial temporal interest points are extracted from a capturing device. At each interest point, extracting a histogram of optical flow (HoF) feature computed on a three-dimensional space-time volume from frame buffers being captured from the visual device embedded in an AR device. A randomly sampled set of motion descriptors from previous recordings and current capture frame is clustered utilizing K-means to form a "visual codebook". A final "bag of visual words and objects" representing frames includes a vector of k values, where the $i^{th}$ value represents a number of motion descriptors in the frames that belong to the $i^{th}$ cluster.

For the equation provided below, features utilized by the object detector are denoted as F and a probability of an activity $A_i$ given the object features is computed by applying a chain rule as follows:

$$P(A_i | F_o) = \sum_{j=1}^{|O|} P(A_i | O_j) * P(O_j | F_o)$$

Where |O| is the total number of object detectors. User's reactionary behavior is incorporated and correlated with a Pearson's correlation in order to classify the criticality of objects detected in further frames of consideration, which can be clustered into multiple risk categories (e.g., low (0-30), moderate (30-70), and high (70-100)).

Embodiments of the present invention create a knowledge corpus for a centralized information repository associated with each user. Over time and training the knowledge corpus is expanded with additional information relating to the user. Optional opt-in embodiments can permit a utilization of a crowdsourced knowledge corpus in conjunction with the knowledge corpus for the centralized information repository associated with each user. The system can draw user context and personal trait identifier from the knowledge corpus to join with environmental surroundings. The system can leverage edge computing to recognize an object and types of risk associated with the identified object based on location and an object type. The system can display a heat map for a surrounding area as a user travels within the environment and a safe movement path for the user is displayed and/or communicated (e.g., audio instructions) to the user.

Figure 4:
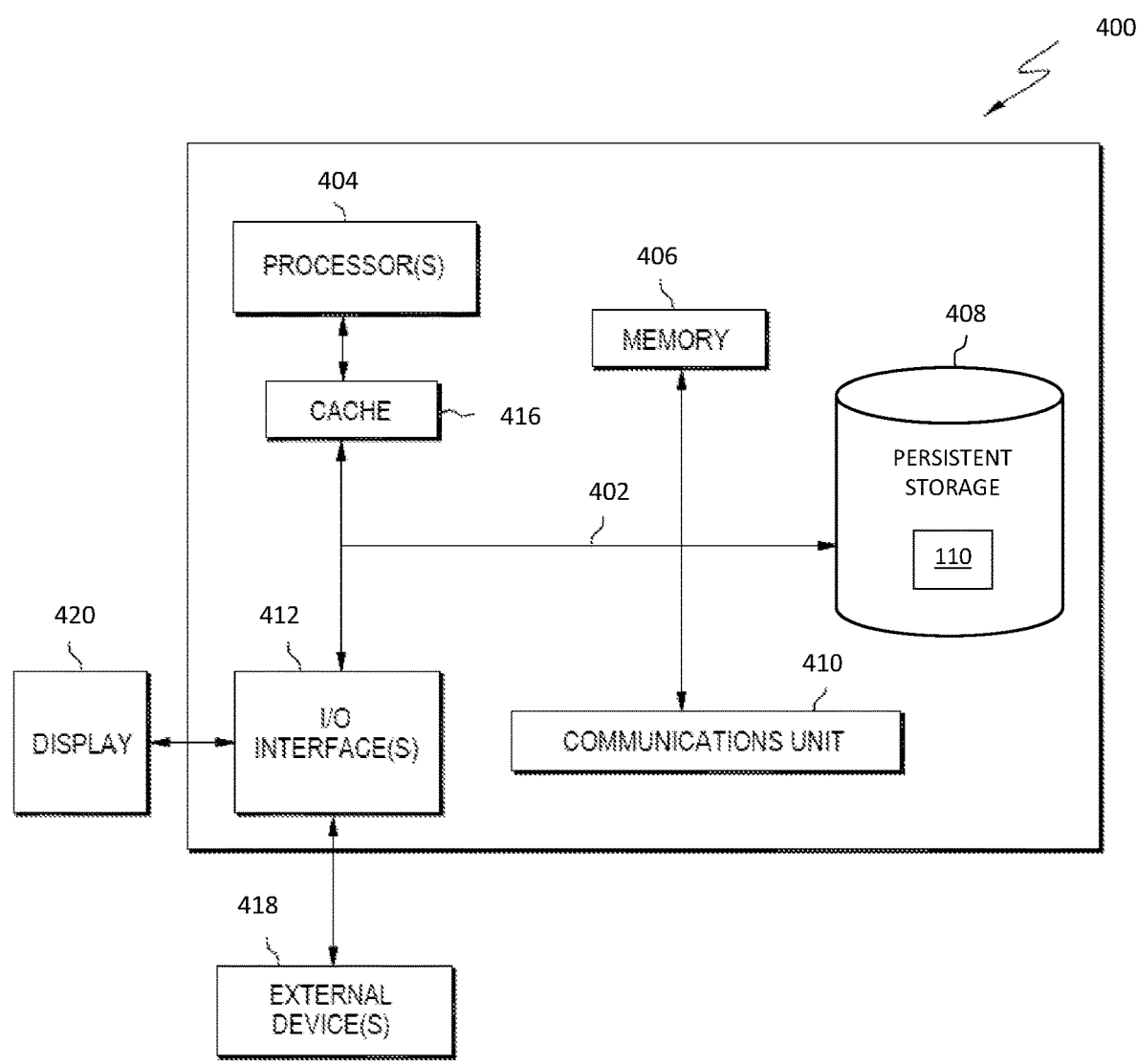
FIG. 4 is a block diagram of components of a computer system, such as the server computer of FIG. 1, in accordance with an embodiment of the present invention.

FIG. 4 depicts computer system 400, where server computer 102 is an example of a computer system 400 that includes surrounding assessment program 110. The computer system includes processors 404, cache 416, memory 406, persistent storage 408, communications unit 410, input/output (I/O) interface(s) 412 and communications fabric 402. Communications fabric 402 provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of processors 404 by holding recently accessed data, and data near recently accessed data, from memory 406.

Program instructions and data used to practice embodiments of the present invention may be stored in persistent storage 408 and in memory 406 for execution by one or more of the respective processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to each computer system. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
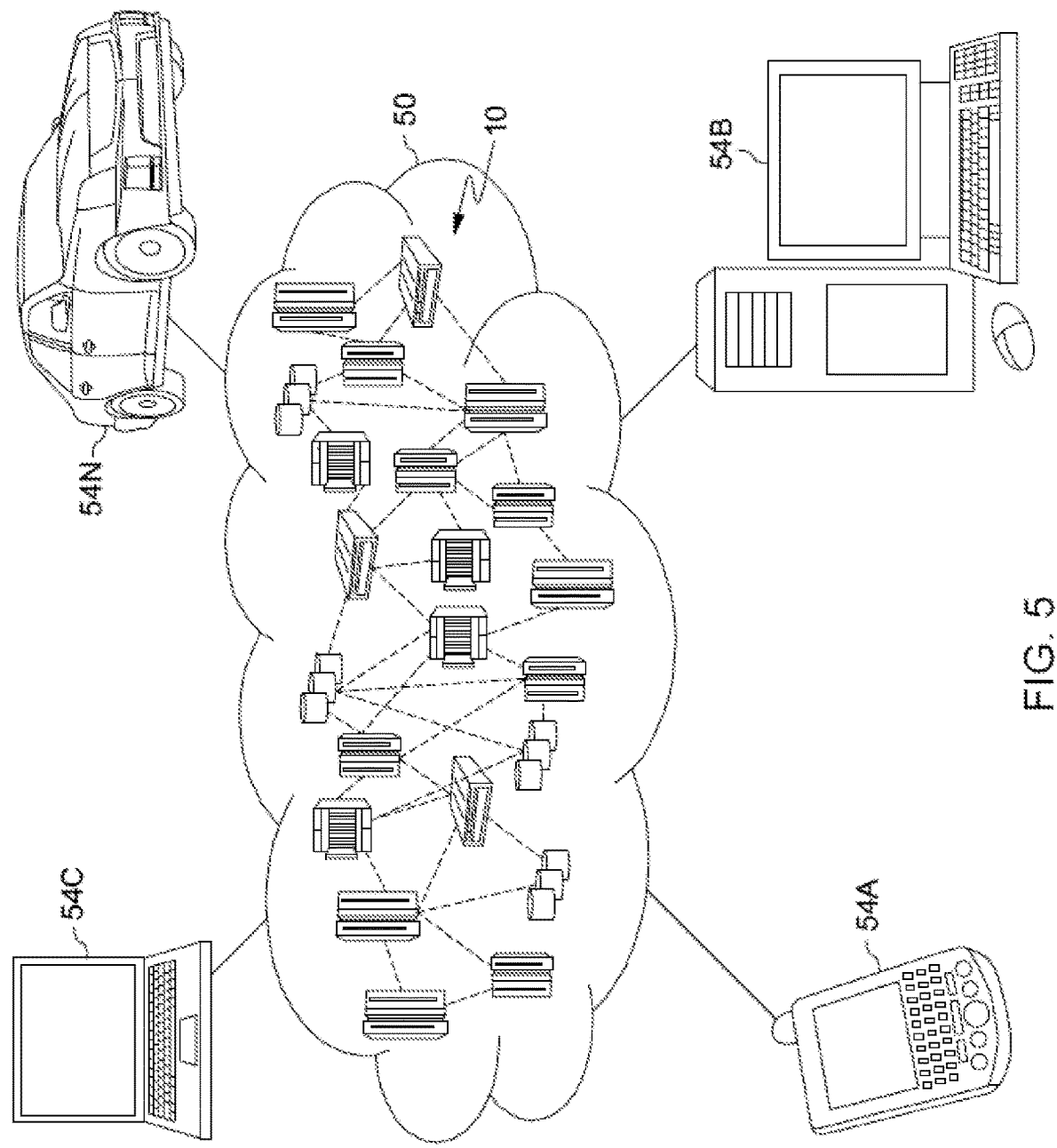
FIG. 5 depicts a cloud computing environment, in accordance with an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
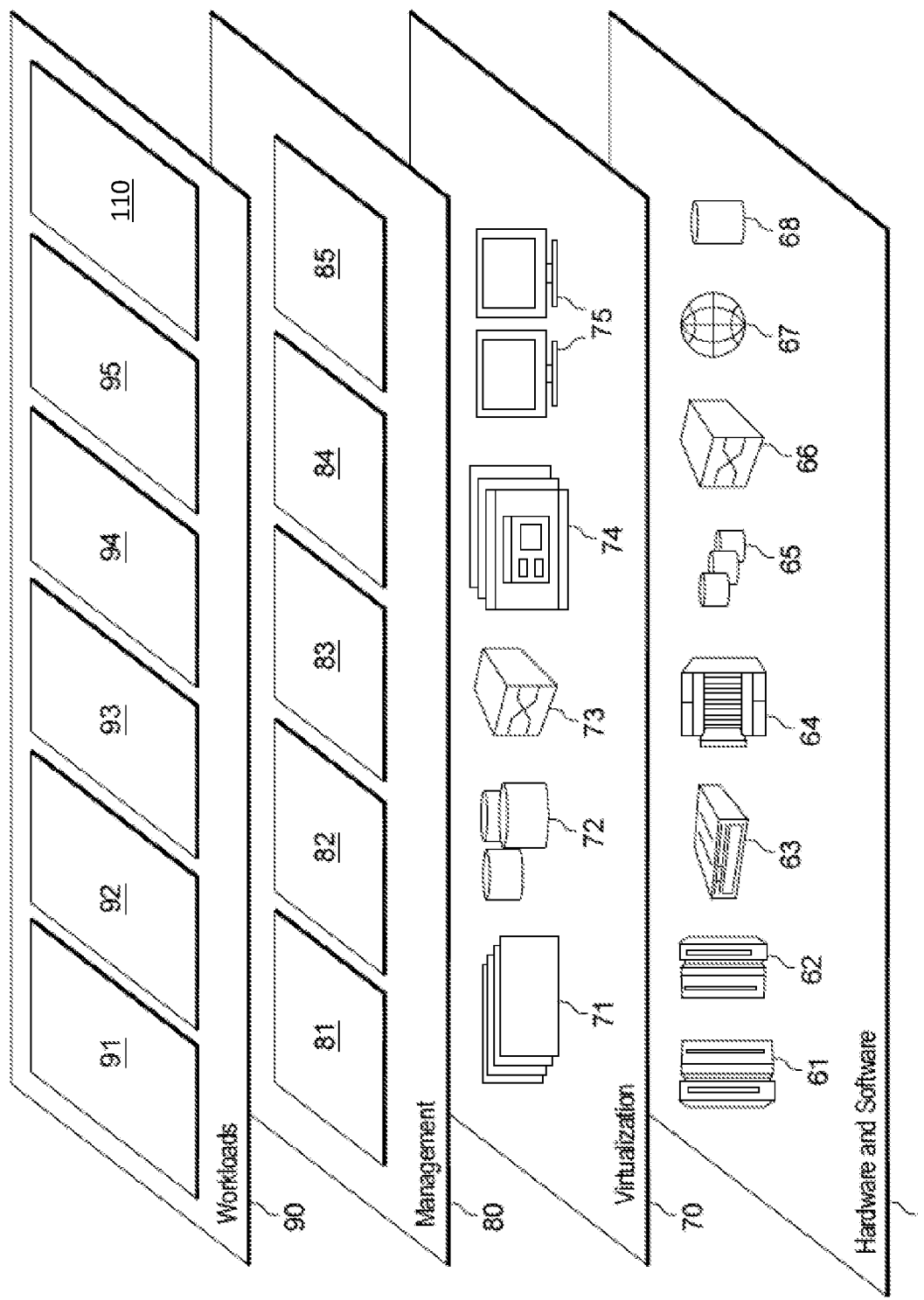
FIG. 6 depicts abstraction model layers, in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and surrounding assessment program 110.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A computer-implemented method comprising:
determining a location of a user;
receiving historical information for the location of the user;
identifying a plurality of items in a surrounding area of the user, wherein the surrounding area includes at least a line of sight of the user as captured by an augmented reality device associated with the user;

analyzing the surrounding area of the user based on the plurality of items and the historical information for the location of the user to produce a plurality of risk levels for the plurality of items for a plurality of specific times, wherein each risk level from the plurality of risk levels is associated with each item from the plurality of items at a specific time;

receiving sensory data for the user at a first specific time, wherein the first specific time is included in the plurality of specific times;

generating a heat map for the surrounding area of the user at the first specific time based on a portion of the plurality of risk levels for the plurality of items at the first specific time in the surrounding area and movements of the user; and displaying the heat map to the user in the augmented reality device.

2. The computer-implemented method of claim 1, further comprising:

determining a path through the heat map for the surrounding area; and displaying the path through the heat map for the surrounding area in the augmented reality device, wherein the path is displayed as a first overlay in the line of sight of the user as captured by the augmented reality device.

3. The computer-implemented method of claim 2, wherein the heat map is displayed as a second overlay on each of the plurality of items in the line of sight of the user as captured by the augmented reality device.

4. The computer-implemented method of claim 1, wherein the analyzing the surrounding area of the user, further comprises:

determining each distance from a plurality of distances between the user and each item from the plurality of items;

parsing the received historical information for the location of the user to identify each portion of the historical information of the user that is associated with each item from the plurality of items; and determining a risk score for each item from the plurality of items relative to the location of the user, wherein the risk score is associated with a specific risk level from the plurality of risk levels.

5. The computer-implemented method of claim 1, further comprising:

receiving sensory data for the user as captured by one or more sensors, wherein the one or more sensors are selected from a group consisting of: an accelerometer, a barometer, a gyroscope sensor, a heart rate sensor, and an orientation sensor.

6. The computer-implemented method of claim 1, wherein the historical information includes operational qualifications for operating one or more items from the plurality of items by the user at the location.

7. The computer-implemented method of claim 6, wherein the historical information further includes a location for a specific item in the determined location of the user, a list of manufacturers specified risks for the specific item, specified walking areas, specified risk areas, historically identified walking areas, locations for incident reports, and crowdsourced user defined risk areas.

8. A computer program product comprising one or more computer readable storage media and program instructions collectively stored on the one or more computer readable storage media, the stored program instructions executable by one or more computer processors, the stored program instructions comprising:

program instructions to determine a location of a user;

program instructions to receive historical information for the location of the user;

program instructions to identify a plurality of items in a surrounding area of the user, wherein the surrounding area includes at least a line of sight of the user as captured by an augmented reality device associated with the user;

program instructions to analyze the surrounding area of the user based on the plurality of items and the historical information for the location of the user to produce a plurality of risk levels for the plurality of items for a plurality of specific times, wherein each risk level from the plurality of risk levels is associated with each item from the plurality of items at a specific time;

program instructions to receive sensory data for the user at a first specific time, wherein the first specific time is included in the plurality of specific times;

program instructions to generate a heat map for the surrounding area of the user at the first specific time based on a portion of the plurality of risk levels for the plurality of items at the first specific time in the surrounding area and movements of the user; and program instructions to display the heat map to the user in the augmented reality device.

9. The computer program product of claim 8, the stored program instructions further comprising:

program instructions to determine a path through the heat map for the surrounding area; and program instructions to display the path through the heat map for the surrounding area in the augmented reality device, wherein the path is displayed as a first overlay in the line of sight of the user as captured by the augmented reality device.

10. The computer program product of claim 9, wherein the heat map is displayed as a second overlay on each of the plurality of items in the line of sight of the user as captured by the augmented reality device.

11. The computer program product of claim 8, wherein the analyzing the surrounding area of the user, the stored program instructions further comprises:

program instructions to determine each distance from a plurality of distances between the user and each item from the plurality of items;

program instructions to parse the received historical information for the location of the user to identify each portion of the historical information of the user that is associated with each item from the plurality of items; and program instructions to determine a risk score for each item from the plurality of items relative to the location of the user, wherein the risk score is associated with a specific risk level from the plurality of risk levels.

12. The computer program product of claim 8, the stored program instructions further comprising:

program instructions to receive sensory data for the user as captured by one or more sensors, wherein the one or more sensors are selected from a group consisting of: an accelerometer, a barometer, a gyroscope sensor, a heart rate sensor, and an orientation sensor.

13. The computer program product of claim 8, wherein the historical information includes operational qualifications for operating one or more items from the plurality of items by the user at the location.

14. The computer program product of claim 13, wherein the historical information further includes a location for a specific item in the determined location of the user, a list of manufacturers specified risks for the specific item, specified walking areas, specified risk areas, historically identified walking areas, locations for incident reports, and crowdsourced user defined risk areas.

15. A computer system comprising:
one or more computer processors;
one or more computer readable storage media; and
program instructions stored on the computer readable storage media for execution by at least one of the one or more computer processors, the stored program instructions comprising:
program instructions to determine a location of a user;
program instructions to receive historical information for the location of the user;
program instructions to identify a plurality of items in a surrounding area of the user, wherein the surrounding area includes at least a line of sight of the user as captured by an augmented reality device associated with the user;
program instructions to analyze the surrounding area of the user based on the plurality of items and the historical information for the location of the user to produce a plurality of risk levels for the plurality of items for a plurality of specific times, wherein each risk level from the plurality of risk levels is associated with each item from the plurality of items at a specific time;
program instructions to receive sensory data for the user at a first specific time, wherein the first specific time is included in the plurality of specific times;
program instructions to generate a heat map for the surrounding area of the user at the first specific time based on a portion of the plurality of risk levels for the plurality of items at the first specific time in the surrounding area and movements of the user; and
program instructions to display the heat map to the user in the augmented reality device.

16. The computer system of claim 15, the stored program instructions further comprising:
program instructions to determine a path through the heat map for the surrounding area; and
program instructions to display the path through the heat map for the surrounding area in the augmented reality device, wherein the path is displayed as a first overlay in the line of sight of the user as captured by the augmented reality device.

17. The computer system of claim 16, wherein the heat map is displayed as a second overlay on each of the plurality of items in the line of sight of the user as captured by the augmented reality device.

18. The computer system of claim 15, wherein the analyzing the surrounding area of the user, the stored program instructions further comprises:
program instructions to determine each distance from a plurality of distances between the user and each item from the plurality of items;
program instructions to parse the received historical information for the location of the user to identify each portion of the historical information of the user that is associated with each item from the plurality of items; and
program instructions to determine a risk score for each item from the plurality of items relative to the location of the user, wherein the risk score is associated with a specific risk level from the plurality of risk levels.

19. The computer system of claim 15, the stored program instructions further comprising:
program instructions to receive sensory data for the user as captured by one or more sensors, wherein the one or more sensors are selected from a group consisting of: an accelerometer, a barometer, a gyroscope sensor, a heart rate sensor, and an orientation sensor.

20. The computer system of claim 15, wherein the historical information includes a location for a specific item in the determined location of the user, a list of manufacturers specified risks for the specific item, specified walking areas, specified risk areas, historically identified walking areas, locations for incident reports, and crowdsourced user defined risk areas.

* * * * *